United States Patent [19]
Schraven et al.

[11] Patent Number: 5,158,780
[45] Date of Patent: Oct. 27, 1992

[54] DEVICE FOR ENCAPSULATING ELECTRONIC COMPONENTS

[75] Inventors: Josephus J. M. Schraven; Marinus B. J. de Kruijff; Maarten Hoekstra, all of Nijmegen, Netherlands

[73] Assignee: Boschman Technologies B.V., Nijmegen, Netherlands

[21] Appl. No.: 710,268

[22] Filed: Jun. 4, 1991

[30] Foreign Application Priority Data

Feb. 26, 1991 [NL] Netherlands .......................... 9100339

[51] Int. Cl.$^5$ ...................... B29C 45/02; B29C 45/08; B29G 3/00
[52] U.S. Cl. ........................................ 425/116; 249/95; 264/272.17; 425/120; 425/192 R; 425/256; 425/572; 425/588; 425/DIG. 228
[58] Field of Search .................... 264/272.17; 425/DIG. 228, 544, 588, 547, 572, 583, 585, 578, 257, 256, 116, 121, 120, 192 R, 125; 249/95

[56] References Cited

U.S. PATENT DOCUMENTS

| | | | |
|---|---|---|---|
| 4,347,211 | 8/1982 | Bandoh | 425/544 |
| 4,511,317 | 4/1985 | Bandoh | 425/DIG. 228 |
| 4,655,274 | 4/1987 | Dannoura | 425/544 |
| 4,723,899 | 2/1988 | Osada | 425/544 |
| 4,915,607 | 4/1990 | Medders et al. | 264/272.17 |

FOREIGN PATENT DOCUMENTS

| | | |
|---|---|---|
| 0070320 | 1/1983 | European Pat. Off. . |
| 0201959 | 4/1986 | European Pat. Off. . |
| 61-74343 | 9/1984 | Japan . |
| 61-177218 | 2/1985 | Japan . |
| 60-184818 | 9/1985 | Japan .................................. 425/544 |
| 62-87318 | 10/1985 | Japan . |
| 62-264483 | 10/1987 | Japan . |
| 63-115710 | 5/1988 | Japan . |
| 1-105716 | 4/1989 | Japan . |

Primary Examiner—Jay H. Woo
Assistant Examiner—Khanh P. Nguyen
Attorney, Agent, or Firm—Ernestine C. Bartlett

[57] ABSTRACT

A device for simultaneously encapsulating a number of electronic components is provided with a locking mechanism in which a molding cycle has two phases, i.e. in a first transfer phase, during which plungers for injecting molten resin into encapsulation cavities are locked and driven at a high, controlled speed, followed by a second curing phase, during which the plungers are spring-loaded, unlocked, and stationary, and are subject to the same maximum pressure of the transfer phase. In this way damage to the products is prevented, while the cycle time is reduced and the products obtained have an even and smooth appearance.

11 Claims, 7 Drawing Sheets

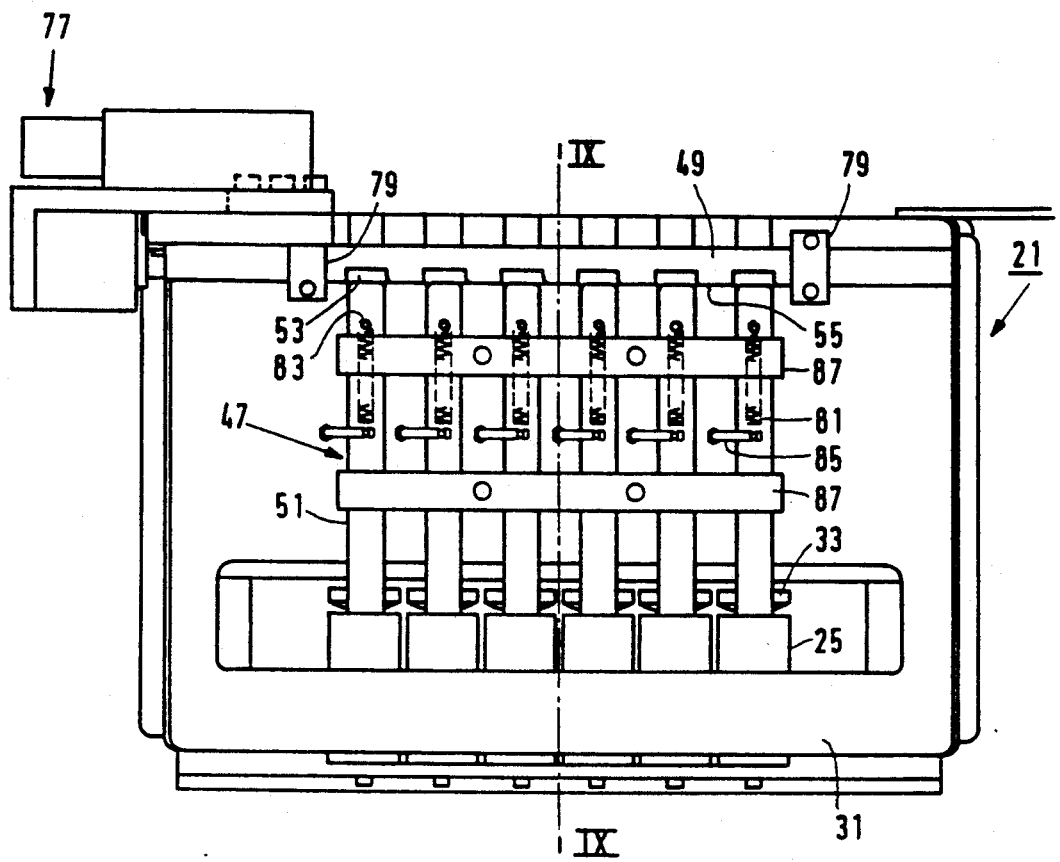

DEVICE FOR ENCAPSULATING ELECTRONIC COMPONENTS

FIELD OF THE INVENTION

The invention relates to a device for encapsulating electronic components with a thermosetting synthetic resin, which device mainly comprises: a mold consisting of an upper mold part and a lower mold part and containing mold cavities, plunger pots and injection gates, heating means for heating the mold, a frame which is reciprocally movable relative to the mold, a number of plungers coupled to the frame and movable in the plunger pots, which plungers can each cooperate with a spring, and a drive mechanism for moving the frame and the plungers relative to the mold.

BACKGROUND OF THE INVENTION

A transfer press of the multiplunger type is generally used for encapsulating electronic components, in particular semiconductors and integrated circuits (IC), in a synthetic material, usually a thermosetting plastic. For this purpose, a strip comprising the relevant IC crystals and consisting of several lead frames is positioned in the mold cavities, upon which the mold is closed. The crystals are connected to the lead frames by gold wires, which are usually provided via a bonding process, e.g., ultrasonic weld. A pressed pellet of the synthetic material to be connected to the frames is introduced into each plunger pot of the mold, which has been heated in the interim. The pellets are heated by the hot mold walls and start melting. During the further heating-up and fusion of the pellets and within a certain time, called transfer time, the plungers introduced into the plunger pots now press the molten synthetic material into the mold cavities, where the material is cured. Then the mold is opened and the strip of cohering encapsulated components is removed from the mold, after which the individual encapsulated components are finally cut from the strip.

The pellets, which are usually cylindrical in shape, may have varying dimensions, depending on the dimensions of the components to be encapsulated, the number of bolt cavities to be filled by a single pellet, the dimensions of the gates, etc. In practice, pellets are frequently used having a diameter of 6 to 18 mm and having a diameter/length ratio of between 1 and 1.7; subject to the dimensions of the products to be encapsulated. The pellets may exhibit length deviations of approximately ±1 mm.

European Patent Application 0 070 320 discloses a device as described in the opening paragraph in which the pellets are pressed and the mold cavities are filled by means of plungers which are loaded by springs.

This known device has the disadvantage that the force to be transmitted by a single plunger is limited and equal to the total force applied divided by the number of plungers. If a pellet having excess length is present in one of the plunger pots, the spring of the relevant plunger is compressed. This increases the pressure on the pellet, which results in a better contact of the synthetic material with the walls of the plunger pot, the mold, and the gates. Owing to this improved contact, the pellet or the not yet molten core of the pellet will be quickly heated up, by which the viscosity of the synthetic material will quickly fall and the compressed spring will relax with a jolt. This sudden relaxation of the spring results in a too high uncontrolled displacement of the relevant plunger, which in its turn results in too high injection speeds of the synthetic material, which may increase to such an extent that the components are damaged. Thus the gold wires may become deformed (wire sweep) or fractured, or the weld bond connections may be broken.

SUMMARY OF THE INVENTION

The invention has for its object to eliminate these disadvantages and to provide a device which permits encapsulation of electronic components without causing damage to these components and which permits processing larger quantities of synthetic material than were customary hitherto in shorter cycle times.

According to the invention, this object is mainly achieved in that the device comprises a locking mechanism which is movable between an operational position and an idle position, the plungers being fixed relative to the frame in the operational position of the locking mechanism and being loaded by the springs in the idle position of the locking mechanism.

The molding cycle preferably can be carried out in two phases. In a first phase, the transfer phase or filling phase, when the locking mechanism is in an operational position, all plungers are rigidly coupled to the frame. The maximum speed of the plungers is limited and equal to the frame speed. The plungers are displaced in a controlled manner with such an optimum speed that in this phase damage to the components as a result of an excessive flow speed of the synthetic material is avoided. In addition, the transfer time is reduced in that the springs are made inoperative, so that a higher pressure can be transmitted via each plunger. In this first phase of the molding cycle, the maximum pressure bearing on the plungers is limited to a certain maximum value through limitation of the current intake of the electric motor which serves to drive the frame. After completion of the transfer phase, in a second phase of the molding cycle, the curing phase, the locking mechanism is set to its idle position, so that the plungers are acted upon by the springs. The same maximum pressure of, for example, approximately $70 \times 10^5$ Pa, is now applied to all plungers, which have now come to a standstill. The switch-over from the first to the second phase takes place when the mold cavities are full.

Tests have shown that with the device according to the invention damage to the components can be avoided, the cycle time can be shortened, and the components in addition have a regular and smooth exterior. The hitherto customary transfer time of 13–20 seconds can be reduced by several seconds in a total machine cycle of approximately 60 seconds.

A preferred embodiment of the device according to the invention is characterized in that the locking mechanism comprises a locking bar which is slidable relative to the frame between an idle position and a locking position and which cooperates with a lever mechanism for driving the plungers. A very simple construction can suffice for simultaneous locking of all plungers due to this measure.

Another preferred embodiment of the device according to the invention is characterized in that a lever mechanism of the device comprises a number of levers equal to the number of plungers, each lever being rotatably fixed with one end on a joint pivot shaft which is mounted to the frame, while the other free end is loaded by an associated spring and cooperates by means of its central portion with an associated plunger, the locking bar cooperating with the free ends of the levers. A very compact assembly is obtained in this way comprising a frame, lever mechanism and locking mechanism. Due to the lever mechanism, comparatively weak springs can suffice owing to the obtained leverage action.

Since in a further preferred embodiment of the device according to the invention a sliding lock is positioned between each lever and the locking bar, the locking may be transferred from the locking bar to the plungers in a simple manner.

In yet another preferred embodiment of the device according to the invention, the levers are firmly pressed against a stop block by means of the sliding locks in the locking position of the locking bar, and pressed resiliently against the stop block under the load of the associated spring in the idle position of the locking bar. The levers may be coupled to the frame rigidly or resiliently by means of the stop block.

In a yet further preferred embodiment of the device according to the invention, each sliding lock is loaded by a spring and pressed against the associated lever. It is achieved through this measure that the sliding locks always bear on the levers, also in the idle position of the locking bar, so that shifting of the locking bar between the idle position and the locking position is facilitated.

BRIEF DESCRIPTION OF THE DRAWING

The invention will be explained in more detail with reference to the drawing, in which FIG. 1 diagrammatically shows an embodiment of a device according to the invention in perspective view, FIG. 2 diagrammatically shows the drive mechanism with the frame used in the embodiment of FIG. 1, FIG. 3 diagrammatically shows the frame with the locking bar in the locking position, FIG. 8 shows the frame in side elevation on an enlarged scale, FIG. 9 shows the frame in cross-section taken on the line IX—IX in FIG. 8, FIG. 10 contains three diagrams representing the locking of the plungers, the pressure on the plungers, and the plunger speed, respectively, seen over a full machine cycle.

DESCRIPTION OF THE PREFERRED EMBODIMENTS

Figure 1:
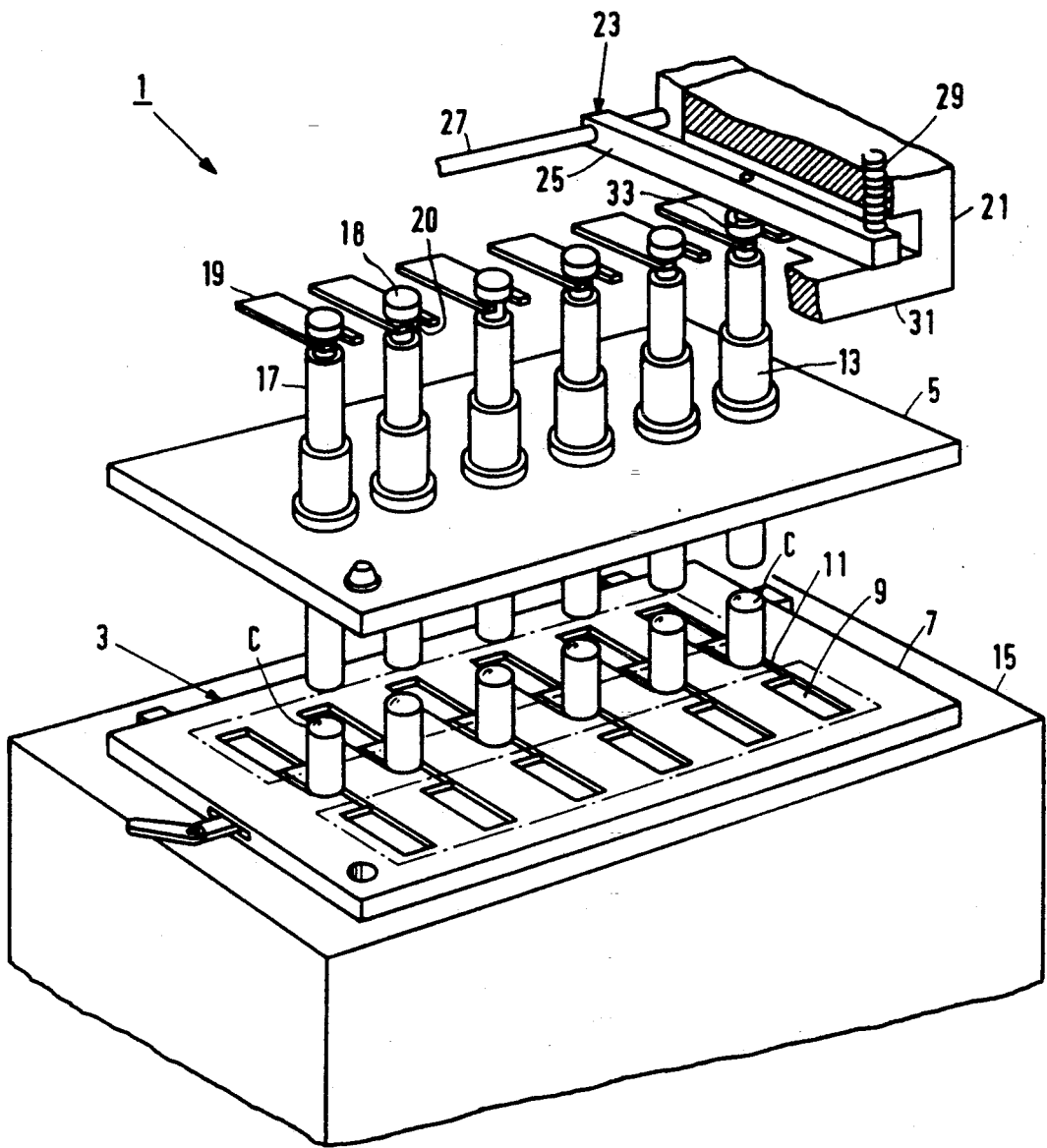

The device 1 diagrammatically depicted in FIG. 1 comprises a mold 3 comprising of an upper mold part 5 and a lower mold part 7 with mold cavities 9 which, when the mold is closed, are in connection with plunger pots 13, which are provided in the upper mold part 5, via injection gates 11. The lower mold part 7 rests on a mold block 15 in which conventional components of the drive for displacing the lower mold part 7 relative to the upper mold part for closing and opening the mold 3, are accommodated (not shown). Plungers 17, which can slide in the plunger pots 13, are coupled by means of coupling elements 19 to a frame 21 which is movable relative to the mold 3 and which comprises a lever mechanism 23 consisting mainly of a number of levers 25 (only one of which is shown) which with one end are rotatably mounted to a common pivot shaft 27 which is fastened to the frame 21. The other free end of each of the levers 25 is loaded by a corresponding spring 29 which presses the lever at the end against a stop block 31 of the frame 21. The levers 25 cooperate with the plungers 17 by means of a pressure element 33 on a corresponding lever central portion. The plastic pellets to be processed are indicated with the reference design at C. Heating of the mold 3 and fusion of the pellets C while the mold is closed take place in a conventional manner by heating means to be explained below.

Figure 2:
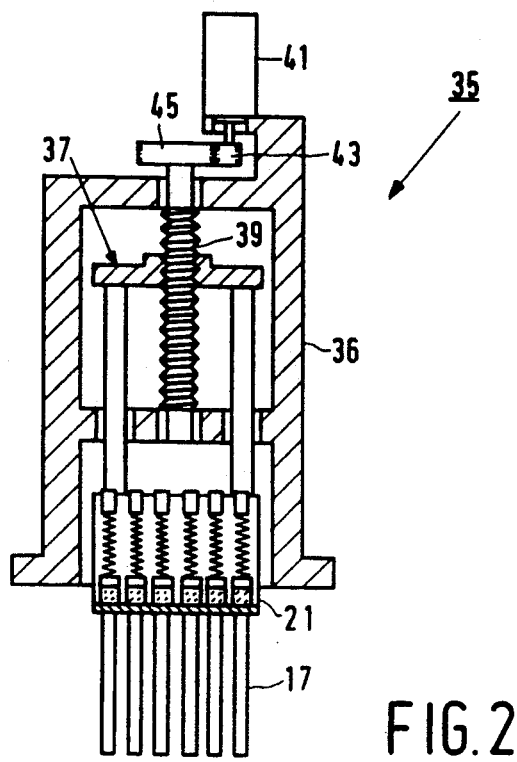

FIG. 2 diagrammatically shows the drive mechanism 35 for displacing the frame 21 and the plungers 17. This drive mainly comprises a housing 36 with a threaded-spindle mechanism 37 consisting of a threaded spindle 39 which is driven by an electric motor 41 via a pinion in a gear 45. The threaded-spindle mechanism 37 can be readily controlled, force and speed being susceptible to a very accurate control by means of a servo system.

Figure 3:
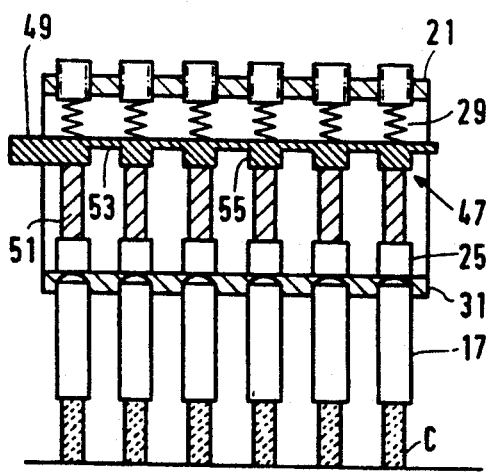
Figure 4:
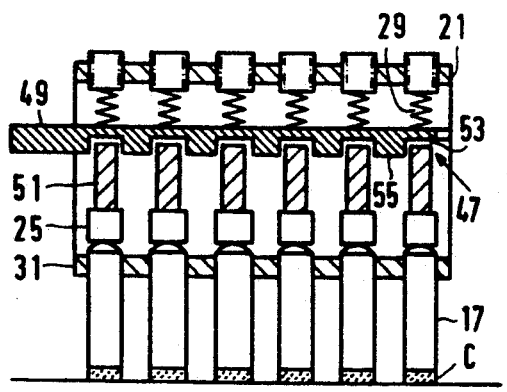
FIG. 4 shows the frame with the locking bar in the idle position.

FIGS. 3 and 4 diagrammatically show the operation of the locking mechanism according to the invention. The locking mechanism 47 shown comprises mainly a locking bar 49 and sliding locks 51 which are provided with sliding capability on the frame 21 between the locking bar 49 and the levers 25. The locking bar 49 is provided with recesses 53 and elevations 55 and is transversely slidable from left to right in the drawing figure between a locking position as shown in FIG. 3 and an idle position, FIG. 4. FIG. 3 shows the locking bar 49 in the locking position, whereby the locking bar 49 with its elevations 55 bears on the sliding locks 51 and thereby presses the levers 25 against the stop block 31, thus locking them. The springs 29, which act directly upon the levers 25, are inoperational, so that the plungers 17 during the transfer stroke are rigidly coupled to the frame 21, while the levers 25 cooperate with collars 18 on the plungers 17 via the pressure elements 33 (FIG. 1). As was explained in more detail above, operations take place with the plungers 17 in this locked position during this first phase of the molding cycle, the transfer phase, during which all plungers are displaced with the same relatively high, controlled speed.

FIG. 4 shows the locking bar 49 in the idle position, whereby the sliding locks 51 come into a free position at the level of the recesses 53, so that the plungers 17 are no longer rigidly coupled to the frame 21 and come under the influence of the springs 29, which lie behind the sliding locks 51 as seen in the drawing and act directly on the levers 25, as will be explained further below. As was described above, in this second phase of the molding cycle, the curing phase, pressure is exerted with the unlocked plungers under spring load, the same force being exerted on all plungers. For the purpose of switching over from the first phase to the second phase through shifting of the locking bar 49 from the locking position into the idle position, the pressure is momentarily removed from the plungers, so that the locking bar 49 can be easily shifted.

As is shown in FIG. 1, the bifurcated coupling elements 19 enclose a neck portion 20 on the plungers 17 below the collar 18. The length of the difurcation groove of elements 19 is greater than the thickness of the coupling elements 19, so that a relative displacement of the coupling elements 19 and the plungers 17 is possible. Differences between the plastic volumes in the plunger pots and between the pressures on the plungers during the curing phase can be compensated through relative displacements of the plungers 17 to the coupling elements 19, during which phase the plungers 17 are loaded by the springs 29.

Figure 5:
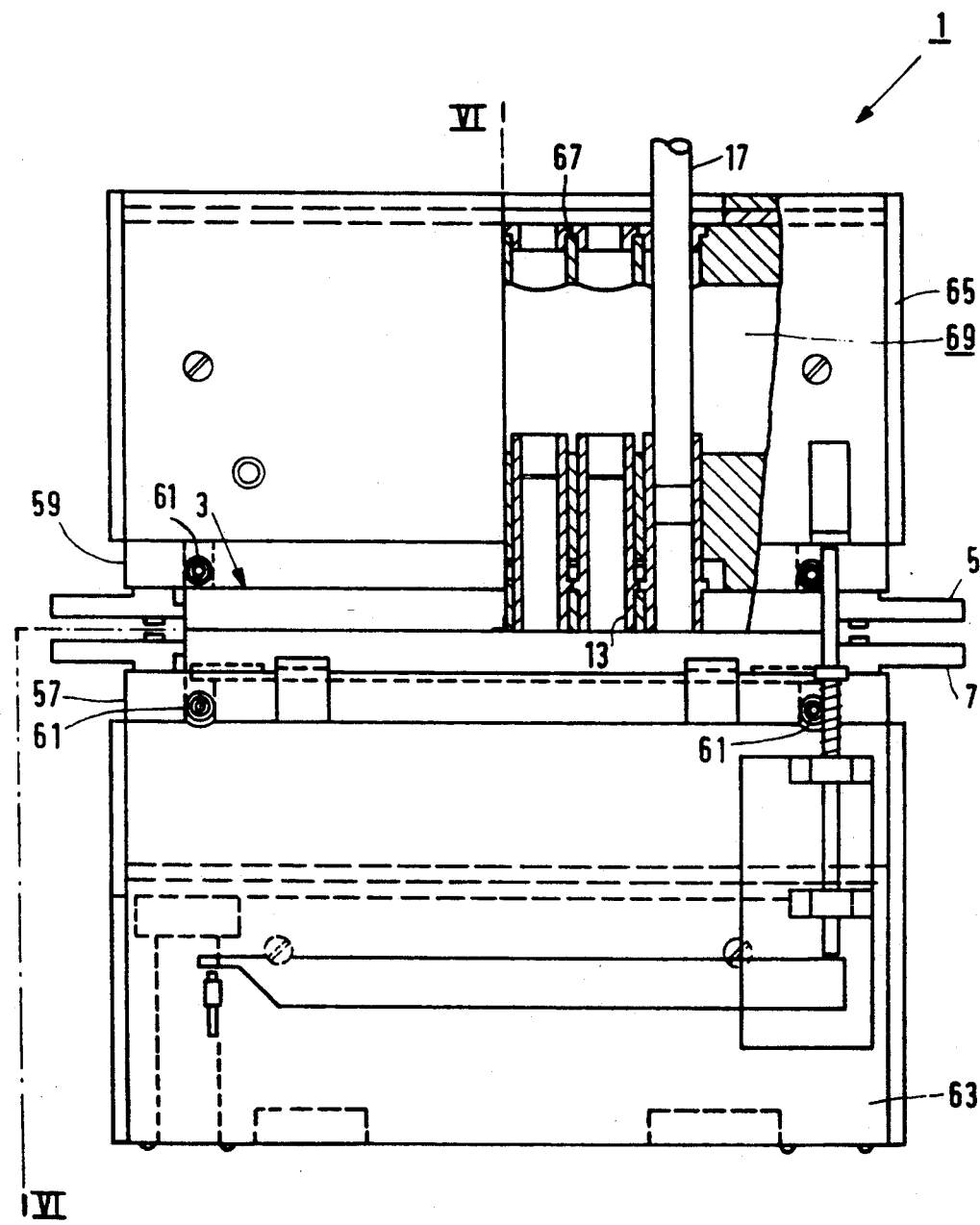
FIG. 5 shows a practical embodiment of the device according to the invention partly in side elevation and partly in longitudinal section taken on the line V—V in FIG. 6.
Figure 6:
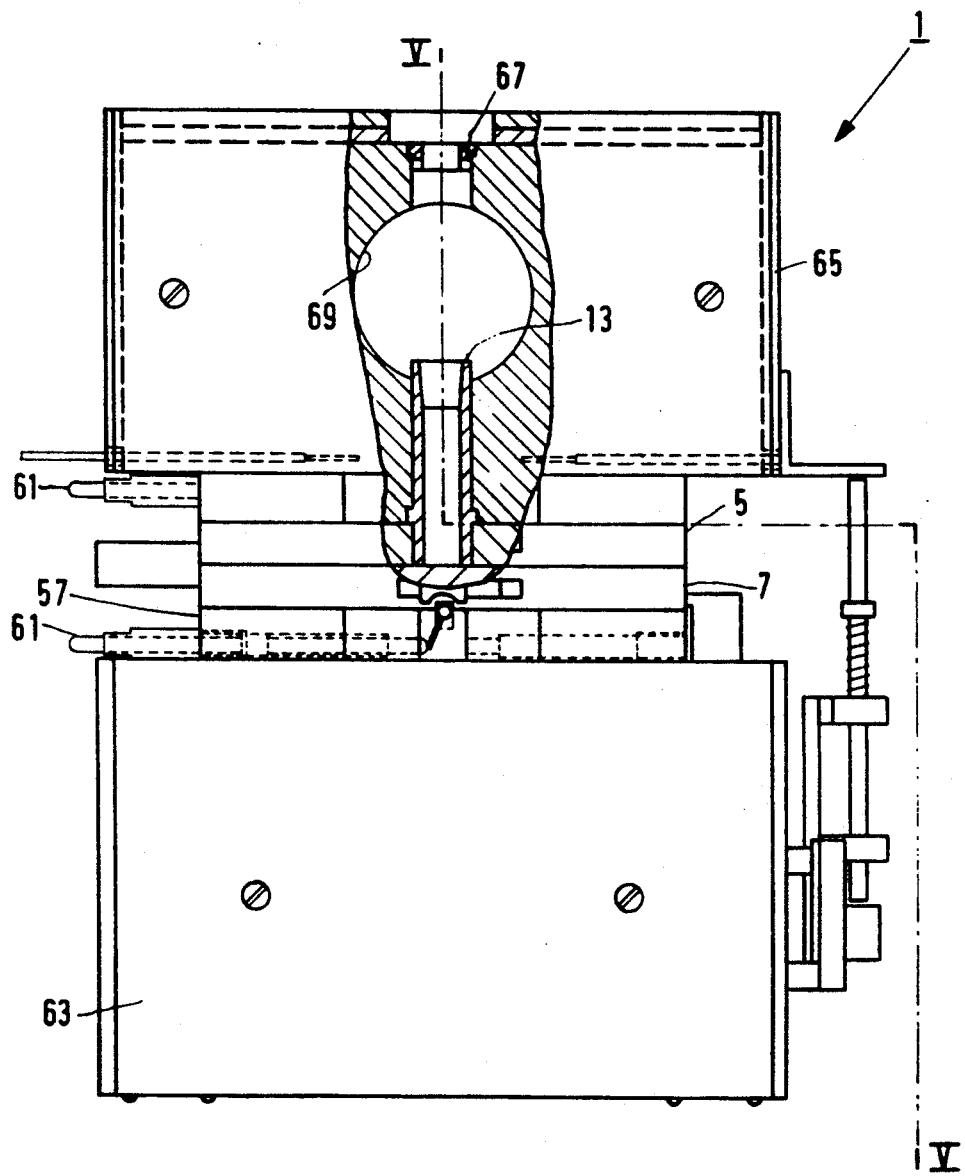
FIG. 6 shows an embodiment of the device partly in front elevation, partly in cross-section taken on the line VI—VI in FIG. 5.

FIGS. 5 and 6 show the device 1 of the multiplunger type with the upper mold part 5, the lower mold part 7, a lower mold part block 57 and with an upper mold part block 59 with plunger pots 13 positioned next to one another in line in longitudinal direction of the mold block. The two mold blocks 57 and 59 comprise heaters 61 for heating the mold 3, to a temperature between 170° C. and 200° C. usual in practice. The reference numeral 63 denotes a support block which forms part of a drive mechanism (not shown) for displacement of the lower mold part 7 relative to the upper mold part 5 for closing and opening the mold 3. The plunger pots 13 extend to inside a plunger block 65 provided with guides 67 for the plungers 17 and with a duct 69 running in the longitudinal direction of the plunger block through which duct the plastic pellets to be processed can be introduced into the plunger pots 13; any suitable feed device may be used for this. Further components are of a conventional nature and will not be explained any further.

Figure 7:
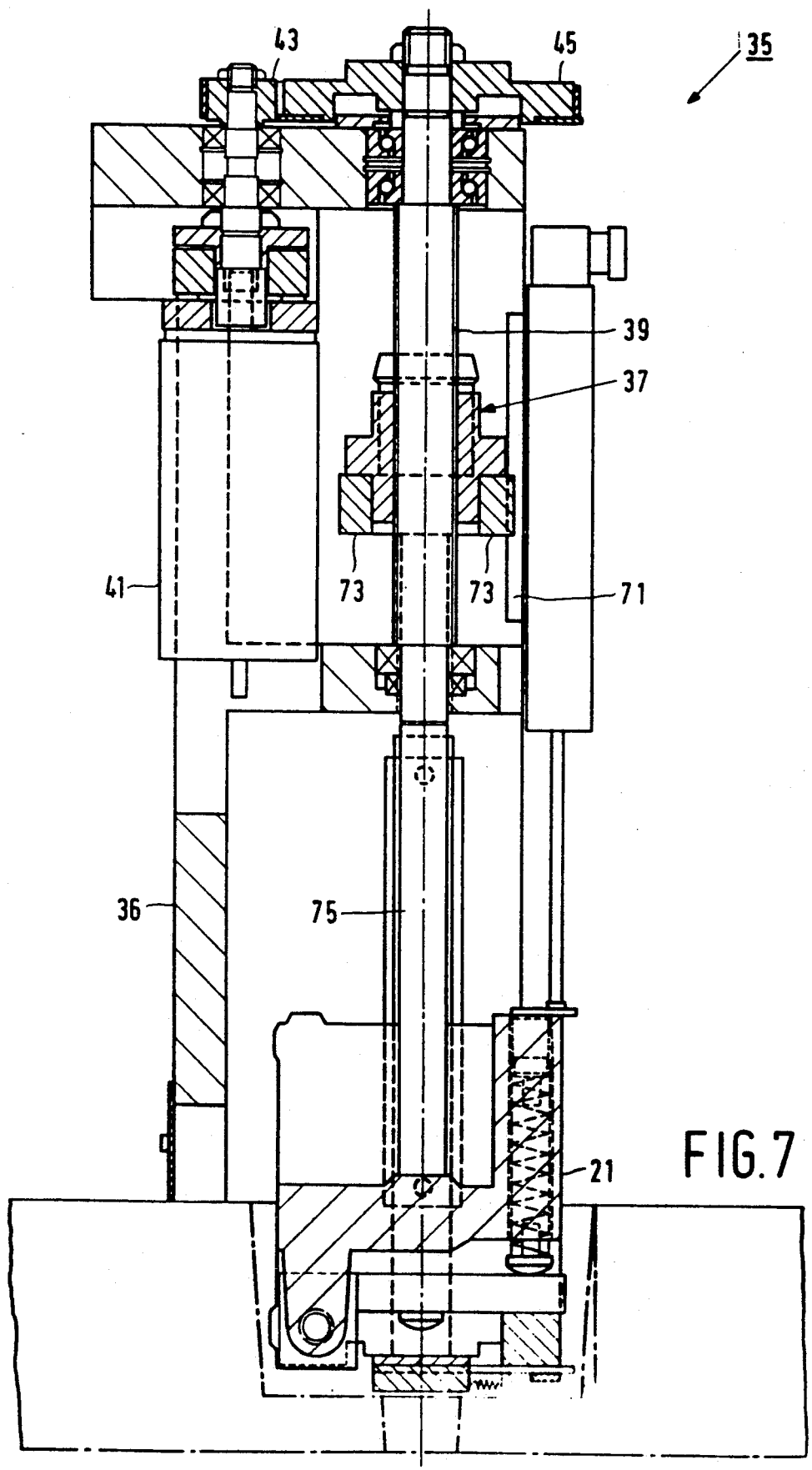
FIG. 7 shows the drive mechanism of FIG. 2 on an enlarged scale together with the frame.

FIG. 7 shows the drive mechanism 35 with the threaded-spindle mechanism 37 consisting of threaded spindle 39, electric motor 41, pinion 43, and gear 45. The numeral 71 denotes a straight guide for two crossbeams 73 which are coupled to the frame 21 via rods 75. The frame 21 will be explained further with reference to FIGS. 8 and 9. These FIGS. show the frame 21 with the lever mechanism 23 comprising the pivot shaft 27 with the levers 25, the springs 29, the stop block 31, and the pressure elements 33. The locking mechanism 47 comprises the locking bar 49 with the recesses 53 and the elevations 55 which in the embodiment shown can be shifted by a pneumatic mechanism 77. Guiding elements 49 serve to guide the locking bar 49 during the shifting movements. Numeral 51 denotes the sliding locks which are pressed against the levers 25 by means of springs 81. The springs 81 are fixed with their ends on pins 83 on the sliding locks 51 and on pins 85 on the frame 21. Guiding bars 87 for guiding the sliding locks 51 are mounted on the frame 21. The reference numeral 89 indicates set screws which serve to set the pre-compression of the springs 29.

Figure 10:
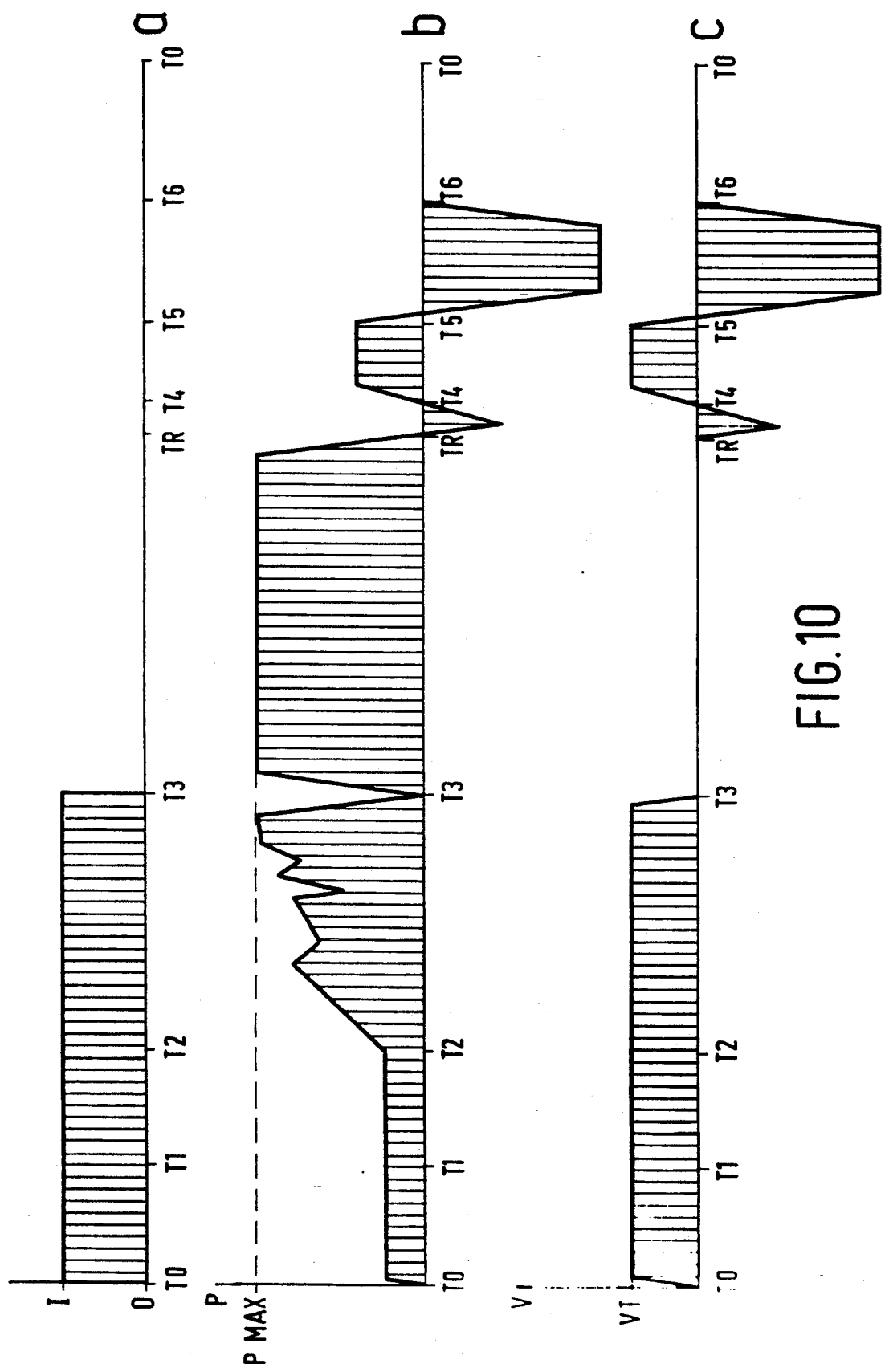

In FIG. 10, diagram a indicates the locking of a plunger, diagram b the pressure on the plunger, and diagram c the plunger speed, seen over a full machine cycle.

Legend

T0 machine cycle start; start of transfer phase; start of plunger movement;
T1 plunger enters plunger pot;
T2 plunger hits pellet;
T3 end of transfer phase; start of curing phase;
T4 end of curing phase;
$T_R$ lifting of pressure from plunger;
T5 mold opens;
T6 plunger returns to initial position;
T0 end of machine cycle; start of new transfer phase.

It is clear from diagram a that the locking mechanism is in the operational position I from the beginning T0 up to the end T3 of the transfer phase, and that it is in the idle position 0 during the remainder of the machine cycle.

Diagram b mainly shows the constant pressure $P_{MAX}$ on the plunger during the curing phase, from the end of the transfer phase T3 to shortly before $T_R$, the lifting of the pressure from the plunger. During molding of the pellets from T2 to T3, pressure fluctuations occur caused by unequal fusion of the pellets, differences in pellet volumes, inhomogeneous viscosity of the fused plastic material, etc.

Finally, diagram c shows the constant speed $V_T$ of the plunger during the transfer phase from T0 to T3, whereas during the curing phase, T3 to $T_R$, the speed of the then stationary plunger has fallen to zero.

The operation of the device was explained above. The device according to the invention is mainly meant for encapsulating semiconductors and integrated circuits. It will be obvious that the device may also be used for encapsulating other products.

What is claimed is:

1. A device for encapsulating electronic components with a synthetic resin, said device comprising: a mold including an upper mold part and a lower mold part, said parts forming a plurality of mold cavities, a plurality of plunger pots and injection gates each coupled to a corresponding different cavity, heating means for heating the mold, a frame reciprocally movable relative to the mold, a plurality of plungers coupled to the frame and movable in the plunger pots, each plunger corresponding to a different pot for forcing mold material from that pot to a cavity via a gate, spring means engaged with each said plungers, said plungers each displacing in response to a resilient load created by said spring means, drive means for moving the frame and the corresponding coupled plungers in a first direction relative to the mold, and locking means movable in a second direction transverse to the first direction between an operational position and an idle position, the plungers being fixed relative to the frame in the operational position of the locking means and being loaded by the springs in the idle position of the locking means.

2. A device as claimed in claim 1 wherein the locking means comprises a locking bar which is slidable relative to the frame between said idle position and said locking position for placing the plungers in said positions and lever means coupled to the frame for driving the plungers in response to displacement of the frame.

3. A device as claimed in claim 2 wherein the spring means includes a plurality of springs each corresponding to a different plunger, the lever means comprising a plurality of levers equal to the number of said plungers, each lever being coupled to and corresponding to a different spring and being rotatably fixed with one end on a joint pivot shaft which is mounted to the frame and the other lever end is loaded by a corresponding one of said springs, said levers each having a central portion coupled to and for operating an associated plunger, the locking bar being coupled to the free ends of the levers for placing said plungers in said positions.

4. A device as claimed in claim 3, including a sliding lock positioned between each lever and the locking bar.

5. A device as claimed in claim 4, wherein the levers are firmly pressed against a stop block by means of the sliding locks in the locking position of the locking bar, and pressed resililently against the stop block under the load of the associated spring in the idle position of the locking bar.

6. A device as claimed in claim 4 wherein each sliding lock is loaded by one of said springs and pressed against the associated lever by that one spring.

7. A device as claimed in claim 5 wherein each sliding lock is loaded by one of said springs and pressed against the associated lever by that one spring.

8. Encapsulation apparatus for electronic components comprising:
   a mold comprising upper and lower mold parts having an ejection state and a mold state, at least one of which parts including a plurality of cavities each for encapsulating a component with a synthetic resin in a mold cycle;
   a plurality of plunger pots secured to at least the other of said parts, each pot for receiving solidified resin, said pots each being coupled in at least the mold state via a corresponding injection gate to a corresponding cavity;
   means for heating the mold for melting said received solidified resin;
   a frame reciprocally movable relative to at least said other of said parts;
   a plurality of plungers coupled to the frame, each plunger corresponding to and engaged with a different plunger pot for displacement in a first direction relative to said engaged pot for applying pressure to said received resin to force the molten resin into the corresponding cavity via said corresponding gate;
   drive means for displacement of the frame and plungers relative to said at least one part; and
   locking means displaceable in a second direction transverse to first direction and having a locking position and an idle position for locking the plungers relative to the frame in the locking position in one portion of a mold cycle and for resiliently loading said plungers relative to said frame in a second portion of the mold cycle.

9. The apparatus of claim 8 wherein said drive means includes means for displacing the frame in the one portion of the cycle to a first mold position and for holding the frame in said first position during said second portion of the cycle.

10. The apparatus of claim 8 wherein said locking means comprises a movably secured bar having recesses and elevations, said locking means including means for causing said elevations to fixedly engage said plungers during said one portion of the cycle and for causing said recesses to releasably engage said plungers in said second portion of said cycle and resilient means coupled to the frame for resiliently engaging the plungers in said second portion of the cycle.

11. The apparatus of claim 10 wherein said drive means includes lever means coupled to said plungers and to said frame for displacing said plungers in response to displacement of said frame, said resilient means including spring means coupled to said lever means and said frame and responsive to the engagement of said recesses with said plungers to form said resilient engagement.

* * * * *